(12) United States Patent
McDowell

(10) Patent No.: US 9,573,331 B2
(45) Date of Patent: Feb. 21, 2017

(54) THERMOPLASTIC POLYURETHANE INFUSED MESH

(75) Inventor: Sean M. McDowell, Andover, MA (US)

(73) Assignee: Converse Inc., Boston, MA (US)

( * ) Notice: Subject to any disclaimer, the term of this patent is extended or adjusted under 35 U.S.C. 154(b) by 724 days.

(21) Appl. No.: 12/965,523

(22) Filed: Dec. 10, 2010

(65) Prior Publication Data

US 2012/0144698 A1    Jun. 14, 2012

(51) Int. Cl.
    *B29D 35/14*    (2010.01)
    *A43B 23/02*    (2006.01)
    *B29C 70/42*    (2006.01)
    *A43B 3/00*    (2006.01)

(52) U.S. Cl.
    CPC ........... *B29D 35/146* (2013.01); *A43B 3/0078* (2013.01); *A43B 23/025* (2013.01); *A43B 23/026* (2013.01); *A43B 23/0255* (2013.01); *A43B 23/0265* (2013.01); *B29C 70/42* (2013.01)

(58) Field of Classification Search
    None
    See application file for complete search history.

(56) References Cited

U.S. PATENT DOCUMENTS

| | | | |
|---|---|---|---|
| 2,133,346 A * | 10/1938 | Diller et al. | 427/290 |
| 3,824,142 A * | 7/1974 | Healy et al. | |
| 6,237,251 B1 | 5/2001 | Litchfield et al. | |
| 7,047,668 B2 * | 5/2006 | Burris et al. | 36/3 A |
| 7,793,435 B1 | 9/2010 | Ruth | |
| 2002/0071946 A1 * | 6/2002 | Norton et al. | 428/304.4 |
| 2002/0078599 A1 * | 6/2002 | Delgorgue et al. | 36/98 |
| 2004/0213959 A1 | 10/2004 | Chiang | |
| 2005/0097658 A1 | 5/2005 | Lyons et al. | |
| 2009/0071036 A1 * | 3/2009 | Hooper et al. | 36/84 |
| 2011/0088285 A1 | 4/2011 | Dojan et al. | |
| 2011/0197475 A1 | 8/2011 | Weidl et al. | |

FOREIGN PATENT DOCUMENTS

CN    101225610    7/2008

OTHER PUBLICATIONS

"Coat." in: Merriam-Webster.com [online], [retrieved on Oct. 31, 2014]. Retrieved from the Internet, <URL: http://www.merriam-webster.com/dictionary/coat>.*

"Infiltrate." in: Merriam-Webster.com [online], [retrieved on Oct. 31, 2014]. Retrieved from the Internet, <URL: http://www.merriam-webster.com/dictionary/infiltrate>.*

(Continued)

*Primary Examiner* — Benjamin Schiffman
(74) *Attorney, Agent, or Firm* — Shook, Hardy & Bacon L.L.P.

(57) ABSTRACT

Embodiments of the present invention relate to a thermoplastic polyurethane ("TPU") infused mesh material that is molded to form at least a portion of a shoe. The TPU infused mesh may be formed as an upper, a portion of sole or other components of a shoe. The TPU infused mesh is formed, in an exemplary embodiment, through the application of liquid TPU to a surface of a spacer mesh. The liquid TPU infused spacer mesh is then cured, cut to a pattern, and heat molded to form a desired portion of the shoe. The heat molded TPU mesh is coupled to other portions of the shoe (e.g., sole) to form an article footwear in an exemplary embodiment.

14 Claims, 5 Drawing Sheets

(56) References Cited

OTHER PUBLICATIONS

"Infuse." in: Merriam-Webster.com [online], [retrieved on Oct. 31, 2014]. Retrieved from the Internet, <URL: http://www.merriam-webster.com/dictionary/infuse>.*

"Submerge." in: Merriam-Webster.com [online], [retrieved on Jun. 11, 2015]. Retrieved from the Internet, <URL: http://www.merriam-webster.com/dictionary/submerge>.*

Notification of Transmittal of the International Search Report and the Written Opinion of the International Searching Authority, or the Declaration in PCT/US2011/063929, dated Mar. 27, 2012, 21 pages.

\* cited by examiner

THERMOPLASTIC POLYURETHANE INFUSED MESH

BACKGROUND

A shoe is typically constructed with a sole and an upper. The sole is traditionally formed from a resilient material, such as foam and/or rubber. The upper is traditionally formed with leather, canvas, or a polymer-based sheet material. A portion of spacer mesh may also be used in the upper of a traditional shoe to provide padding or support. A spacer mesh is a knitted synthetic product that is typically flexible and soft. However, spacer mesh has traditionally only been a supplemental material in the construction of the upper. A traditional shoe's upper exterior and main structure is typically provided by the traditional materials (e.g., leather, canvas) used to form the upper.

SUMMARY

Embodiments of the present invention relate to a thermoplastic polyurethane ("TPU") infused mesh material that is molded to form at least a portion of a shoe's upper. The TPU infused mesh is formed, in an exemplary embodiment, through the application of liquid TPU to a surface of a spacer mesh. The liquid TPU infused spacer mesh is then cured, cut to a pattern, and heat molded to form a desired portion of a shoe. The heat molded TPU mesh is coupled to other portions of the shoe (e.g., sole) to form an article footwear.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
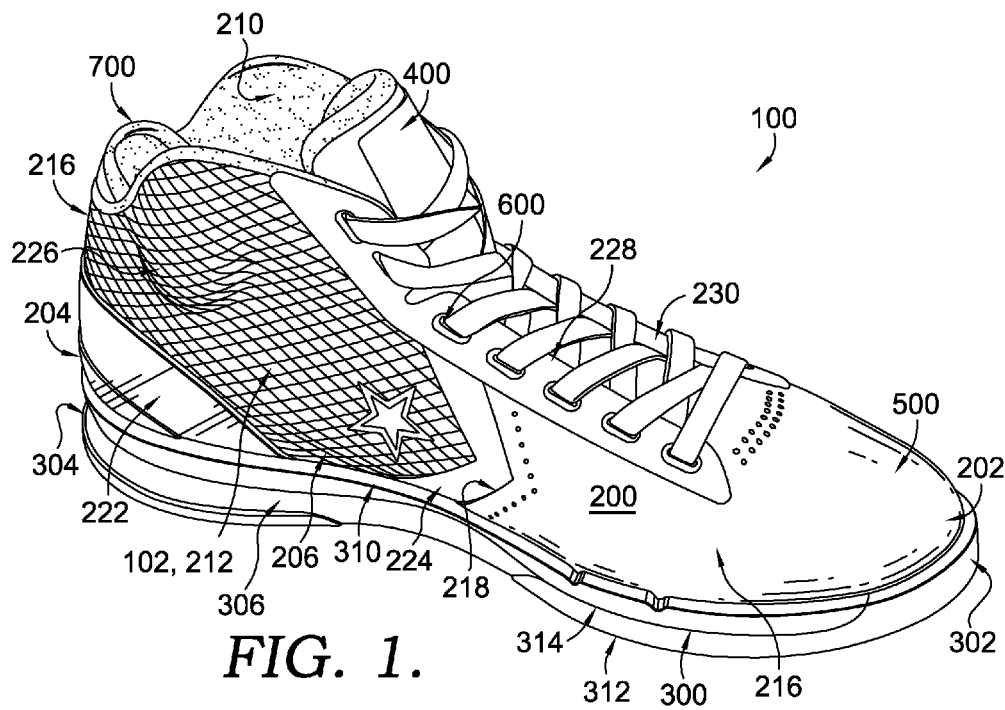
FIG. 1 depicts a medial perspective view of an exemplary shoe having a TPU infused mesh upper portion, in accordance with embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Embodiments of the present invention relate to a thermoplastic polyurethane ("TPU") infused mesh material that is molded to form at least a portion of a shoe's upper. The TPU infused mesh is formed, in an exemplary embodiment, through the application of liquid TPU to a surface of a spacer mesh. The liquid TPU infused spacer mesh is then cured, cut to a pattern, and heat molded to form a desired portion of a shoe. The heat molded TPU mesh is coupled to other portions of the shoe (e.g., sole) to form an article footwear.

Accordingly, in one aspect, the present invention provides a method of manufacturing a TPU infused material for use in construction of a shoe. The method includes applying TPU to at least one surface of a flexible material, which forms a TPU infused material. The method also includes curing the TPU infused material, which may be accomplished in an oven at an elevated temperature. The method may also include cutting the TPU infused material into a pattern useable in construction of the shoe. For example, the TPU infused material may be cut into a pattern that, when molded, forms a portion of an upper. The method also includes heat molding the pattern of the TPU infused material to form a molded portion. The heat molding process may be applied at a temperature at which the TPU reacts, but the spacer mesh remains in a solid state.

A second aspect of the present invention provides an article of footwear constructed with thermoplastic polyurethane (TPU) infused material. The article of footwear includes a sole having a toe end, a heel end, a lateral side, and a medial side. The article of footwear also includes an upper extending upwardly from the sole. An exterior surface of the upper forms at least a portion of an exterior surface of the article of footwear. Additionally, at least a portion of the upper is a TPU infused spacer mesh material.

A third aspect of the present invention provides a method of manufacturing a shoe upper with a TPU infused spacer mesh. The method includes cutting the TPU infused spacer mesh into a pattern for a portion of the shoe upper. The TPU infused spacer mesh is a knit spacer mesh infused with a cured liquid TPU. The method also includes heat molding the pattern to form the portion of the shoe upper. In an exemplary embodiment, the portion includes a heel surrounding portion of the upper. The method additionally includes coupling the heat molded portion of the shoe upper formed from the TPU infused spacer mesh to a shoe sole.

Having briefly described an overview of embodiments of the present invention, a more detailed description follows.

The construction of an exemplary article of footwear ("shoe") 100 of the present invention has the basic construction of a traditional shoe. However, the shoe 100 is constructed with an upper 200 that is comprised of a toe portion 216 and a heel portion 214. The heel portion is formed from a thermoplastic polyurethane ("TPU") infused spacer mesh ("TPU mesh"). In an exemplary embodiment, the TPU mesh is made from a spacer mesh to which a liquid TPU has been applied. The liquid TPU is cured on/in the spacer mesh. In this example, the cured TPU mesh is then cut to a pattern size and heat molded to form a portion of the upper 200. Finally, in an exemplary embodiment, the molded TPU mesh is then coupled to a sole 300 of the shoe 100.

In embodiments, the shoe 100 is a high-top basketball-style shoe. However, it should be understood that the TPU mesh could be employed on other types of shoes (e.g., low-top, infant, toddler, children, adult, cross-training, running, lifting, sandals, clogs, boots, and the like). Because much of the construction of the shoe 100 is the same as that of a conventional shoe, the conventional features of the constructions will be described only generally herein.

As is traditional with a shoe, the sole 300 is constructed from a midsole 314 and an outsole 316. Additionally, in an exemplary embodiment, the sole 300 may include an insert as is also common to a shoe sole. The sole 300 has a toe end 302, an opposite heel end 304, a medial side 306, and an opposite lateral side 308. As a result, the sole 300 forms a perimeter 310 that extends around the sole 300 and includes the toe end 302, the heel end 304, the medial side 306, and the lateral side 308. The sole 300 may be constructed from a resilient material or combination of materials. For example, the midsole 314 may be formed from a foam, polymer, rubber, or the like. Similarly, the outsole 312 may be formed from similar materials.

The shoe 100 also is constructed with the upper 200. The upper 200 is secured to the sole 300 and extends upwardly from a midsole top surface. The upper 200 has a medial side portion 206 and a lateral side portion 208 that extend along the respective sole medial side 306 and the sole lateral side 308. The upper medial side portion 206 extends upwardly from the sole medial side 306 to an upper medial side edge 228. The upper lateral side portion 208 extends upwardly from the sole lateral side 308 to an upper lateral side edge 230. The upper medial side edge 228 and the upper lateral side edge 230 extend rearwardly from opposite sides of the toe end 202 of the upper 200. As is typical, a length of the upper medial side edge 228 and the upper lateral side edge 230 define a forefoot opening in the upper 200 that opens to a shoe interior.

As is typical of a shoe construction, the upper 200 may also be constructed with a toe box 500 that extends around and across a midsole top surface at the toe end 302. The toe box 500, in this exemplary embodiment, is connected between the upper medial side portion 206 and the upper lateral side portion 208 and encloses a portion of the shoe interior adjacent the sole toe end 302. The upper medial side edge 228 and the upper lateral side edge 230 may extend rearwardly from the toe box 500.

A first plurality of apertures 600 are provided on the upper medial side portion 206 and a second plurality of the apertures 600 are provided on the upper lateral side portion 208. The apertures 600 are lacing openings in an exemplary embodiment. A lacing opening is an opening that is typically occupied by a portion of a fastener, such as lacing that closes the shoe upper 200 over the forefoot opening of the shoe 100. The apertures 600 may provide any type of lacing openings on the shoe, for example, D-rings or speed lacing hooks. However, in an exemplary embodiment, the apertures 600 are an eyelet or grommet style aperture. The apertures 600 are arranged in lines along the upper medial side portion 206 and the upper lateral side portion 208, as is conventional. As illustrated in the figures, the apertures 600, in an exemplary embodiment, extend substantially the entire length of the upper medial side edge 228 and the upper lateral side edge 230.

The upper 200 may include a vamp or a throat positioned rearwardly of the toe box 500, and a tongue 400 that extends rearwardly from the vamp through the forefoot opening. The tongue 400 extends along the lengths of the upper medial side portion 206 and the upper lateral side portion 208 to a distal end of the tongue, a tongue upper edge, near an ankle opening.

Figure 6:
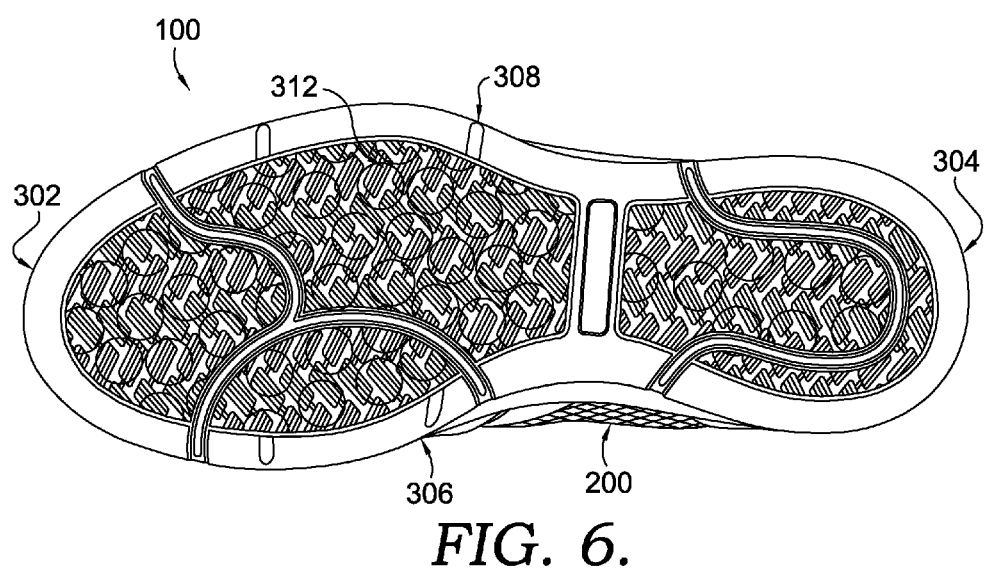
FIG. 6 depicts a bottom view of the exemplary shoe having the TPU infused mesh upper, in accordance with an embodiment of the present invention.
Figure 7:
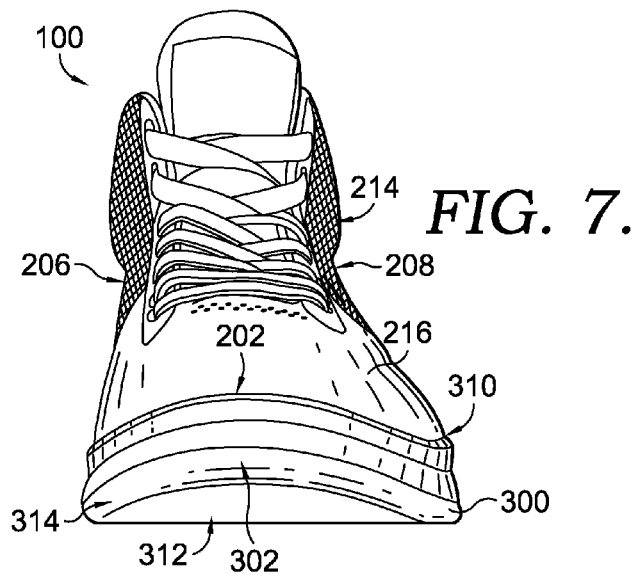
FIG. 7 depicts a toe end view of the exemplary shoe having the TPU infused mesh upper, in accordance with an embodiment of the present invention.
Figure 8:
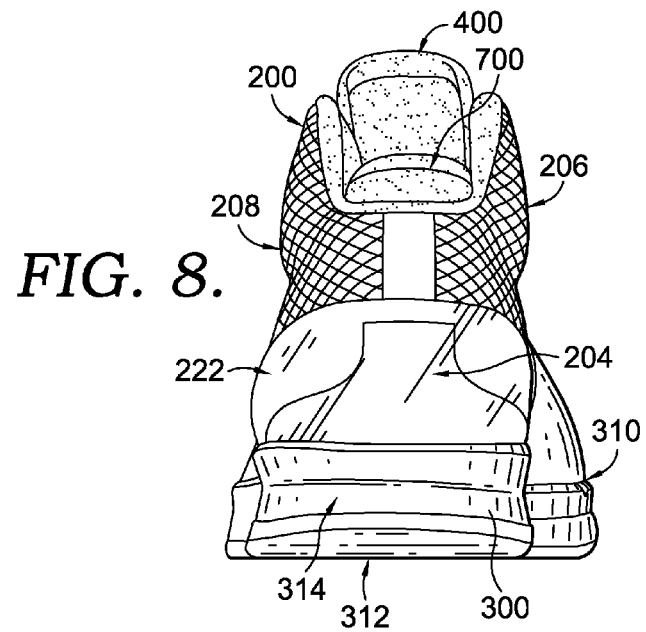
FIG. 8 depicts a heel end view of the exemplary shoe having the TPU infused mesh upper, in accordance with an embodiment of the present invention.

As is typical with a shoe, the size of the shoe 100 has a length that extends from the sole heel end 304 to the sole toe end 302. As also best seen in FIG. 6, the shoe 100 has a width that extends between the medial side 306 and the sole lateral side 308.

The upper 200 may be formed with the TPU mesh, which provides a rigid, breathable, lightweight material that is suitable for forming an upper of a shoe. Traditionally, spacer mesh, which is sometimes referred to as 3D mesh, air mesh, and/or sandwich mesh, is a flexible material that may provide padding and volume to an item. Spacer mesh is typically a knitted material formed from a synthetic fiber, such as polyester and/or nylon. In an exemplary embodiment, the spacer mesh has an exterior surface 212 and an interior surface 210. Between the interior surface 210 and the exterior surface 212, the spacer mesh includes a fibrous mass that is adjusted to vary a thickness of the spacer mesh.

The interior surface 210 and the exterior surface 212 may be a similar texture or design, such as a diamond knitted pattern illustrated in the figures. However, it is contemplated that the interior surface 210 is different than the exterior surface 212 in an exemplary embodiment. For example, to optimize airflow and/or rigidity, the interior surface 210, which may form a portion of the interior of the upper 200, may have a smaller (or larger) woven pattern than the exterior surface 212, which may form a portion of the exterior surface 102 of the shoe 100.

Additionally, it is contemplated that a thickness of the spacer mesh may be changed depending on a portion of the shoe 100 that the spacer mesh will be utilized. For example, a spacer mesh intended for use near a heel portion 214 may be thicker and therefore more rigid than a spacer mesh that may be used as part of a toe portion 216, which may require more flexibility. As will be discussed in more detail hereinafter, the thickness of the spacer mesh may be changed by selecting a different thickness of material or it may be manipulated by applying a compressive force and/or heat to the TPU mesh.

As illustrated in the figures, the upper 200 may be constructed from a combination of TPU mesh in a first location (e.g., the heel portion 214) and from traditional materials in a second location (e.g., the toe portion 216). However, it is also contemplated that the TPU mesh may be utilized to form the entirety of the upper 200, in an exemplary embodiment.

Additionally, it is contemplated that a supplement 222 may be coupled to one or more portions of the upper 200. For example, proximate the heel end 204, the supplement 222 may be coupled to the TPU mesh for additional support. In this example, the supplement 222 is a polymer-type material coupled to both the upper 200 and the sole 300 to provide additional lateral support for a heel region of a wearer's foot. The supplement 222 may complement the TPU mesh when used in conjunction to form a portion of the upper 200. For example, the TPU mesh may maintain a thinner thickness when formed as part of the upper when the supplement 222 is implemented at strategic locations that require greater structural support.

A TPU mesh portion of an upper 200 may be coupled to the sole 300 utilizing techniques common to shoe construction. Additionally, it is contemplated that the TPU mesh may be adapted to bond with the sole 300 utilizing a TPU glue. For example, because the TPU mesh is infused with TPU, the TPU mesh may be more susceptible to bonding characteristic of the TPU glue than traditional material used to form a traditional upper. However, it is contemplated, as previously discussed, that other coupling techniques may be utilized to couple the TPU mesh portion of the upper 200 to the sole 300. In an exemplary embodiment, the TPU mesh is stitched to a portion of the sole 300.

Figure 2:
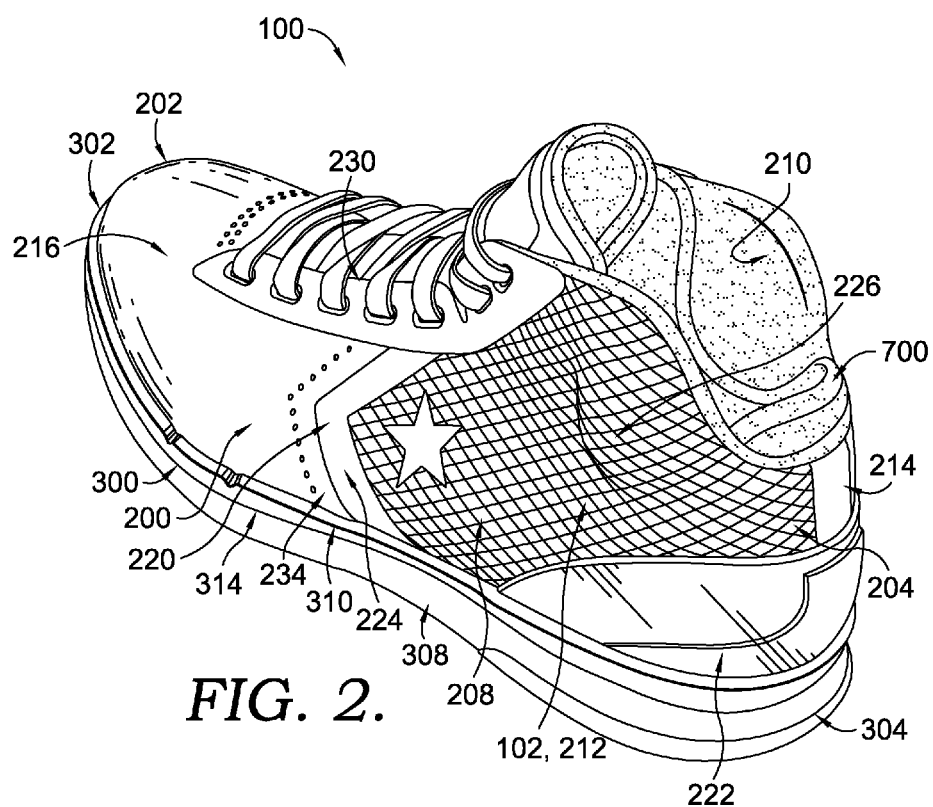
FIG. 2 depicts a lateral perspective view of the exemplary shoe having the TPU infused mesh upper, in accordance with an embodiment of the present invention.
Figure 3:
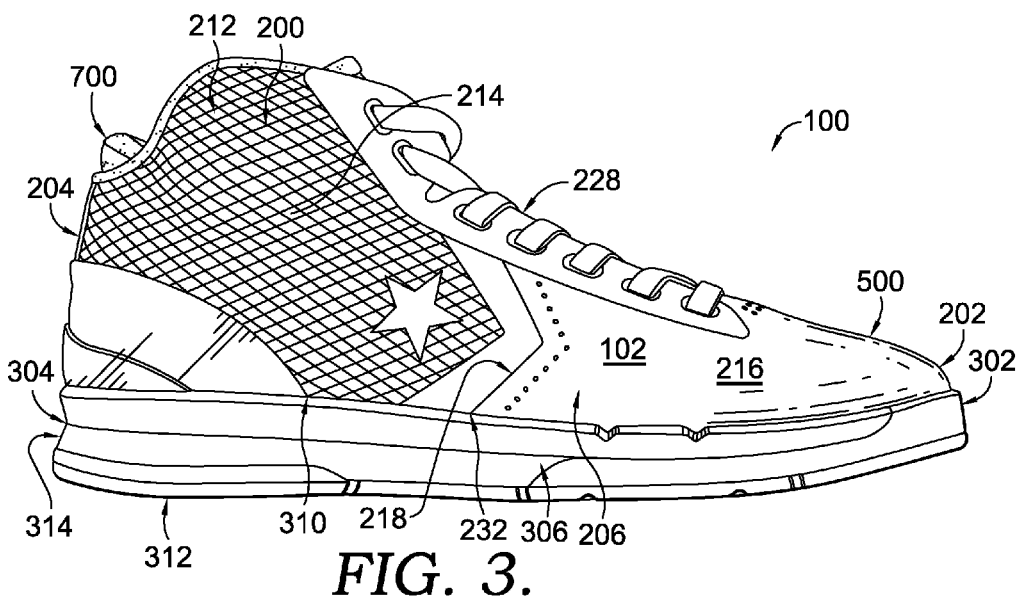
FIG. 3 depicts a medial view of the exemplary shoe having the TPU infused mesh upper, in accordance with an embodiment of the present invention.
Figure 4:
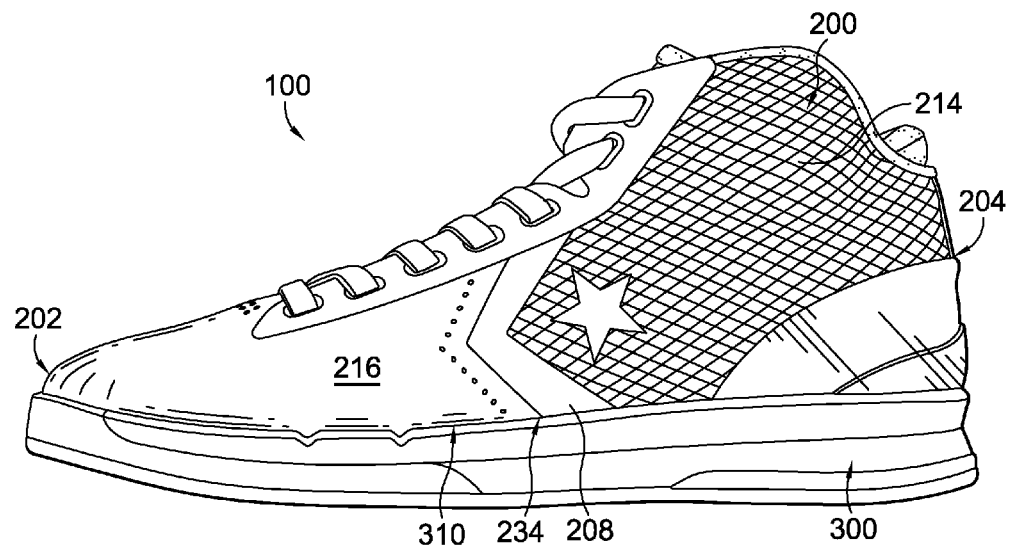
FIG. 4 depicts a lateral view of the exemplary shoe having the TPU infused mesh upper, in accordance with an embodiment of the present invention.
Figure 5:
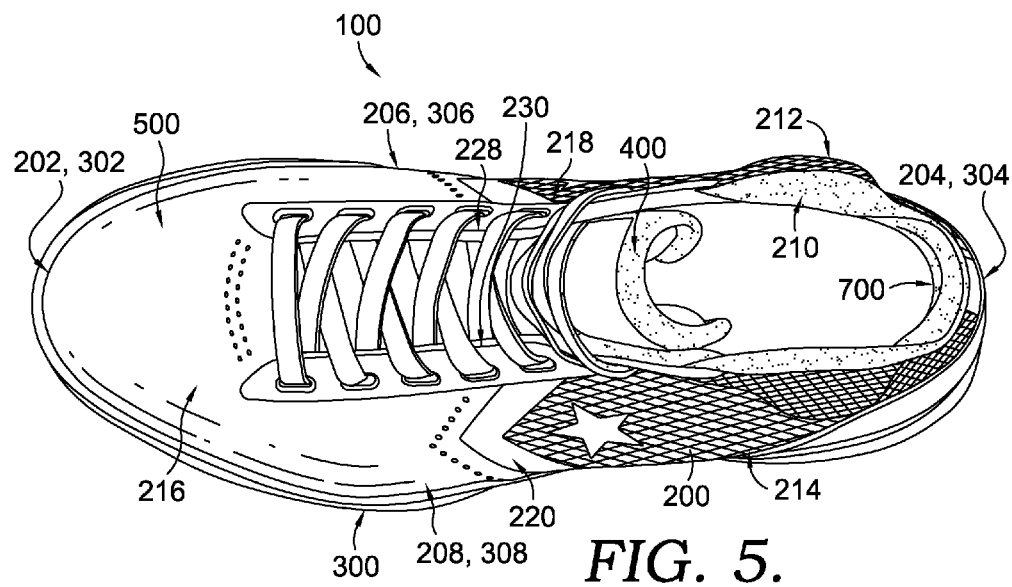
FIG. 5 depicts a top view of the exemplary shoe having the TPU infused mesh upper, in accordance with an embodiment of the present invention.

Similarly, when coupling a TPU mesh portion of the upper 200 to another portion of the upper 200, a seam reinforcement 224 may be utilized. For example, the toe portion 216 illustrated in the figures is a material other than the TPU mesh (leather, polymer, natural fibrous material, and/or the like). Conversely, the heel portion 214 is constructed from the TPU mesh. In this example, as best seen in FIGS. 1 and 2, the toe portion 216 is coupled with the heel portion 214 proximate a medial midpoint 232 and a lateral midpoint 234 near the perimeter 310. A medial junction 218 and a lateral junction 220 are formed by the coupling of the toe portion 216 and the heel portion 214. In an exemplary embodiment, the seam reinforcement 224 is applied to the TPU mesh proximate the medial junction 218 and the lateral junction 220 to reinforce the coupling of the toe portion 216 and the heel portion 214.

In an exemplary embodiment, the seam reinforcement 224 is affixed with an adhesive or welded (chemical, heat, Radio Frequency, ultrasonic) to the TPU mesh. Therefore, if a material that is conducive for stitching is intended to be coupled to the TPU mesh, the material may be stitched to the seam reinforcement 224 (individually or in addition to the TPU mesh) to couple the material and the TPU mesh. Because the TPU mesh is a mesh with a variable lattice structure, the TPU mesh may not be suitable for stitching techniques. However, it is contemplated that the TPU mesh is suitable for stitching in an exemplary embodiment.

Figure 9:
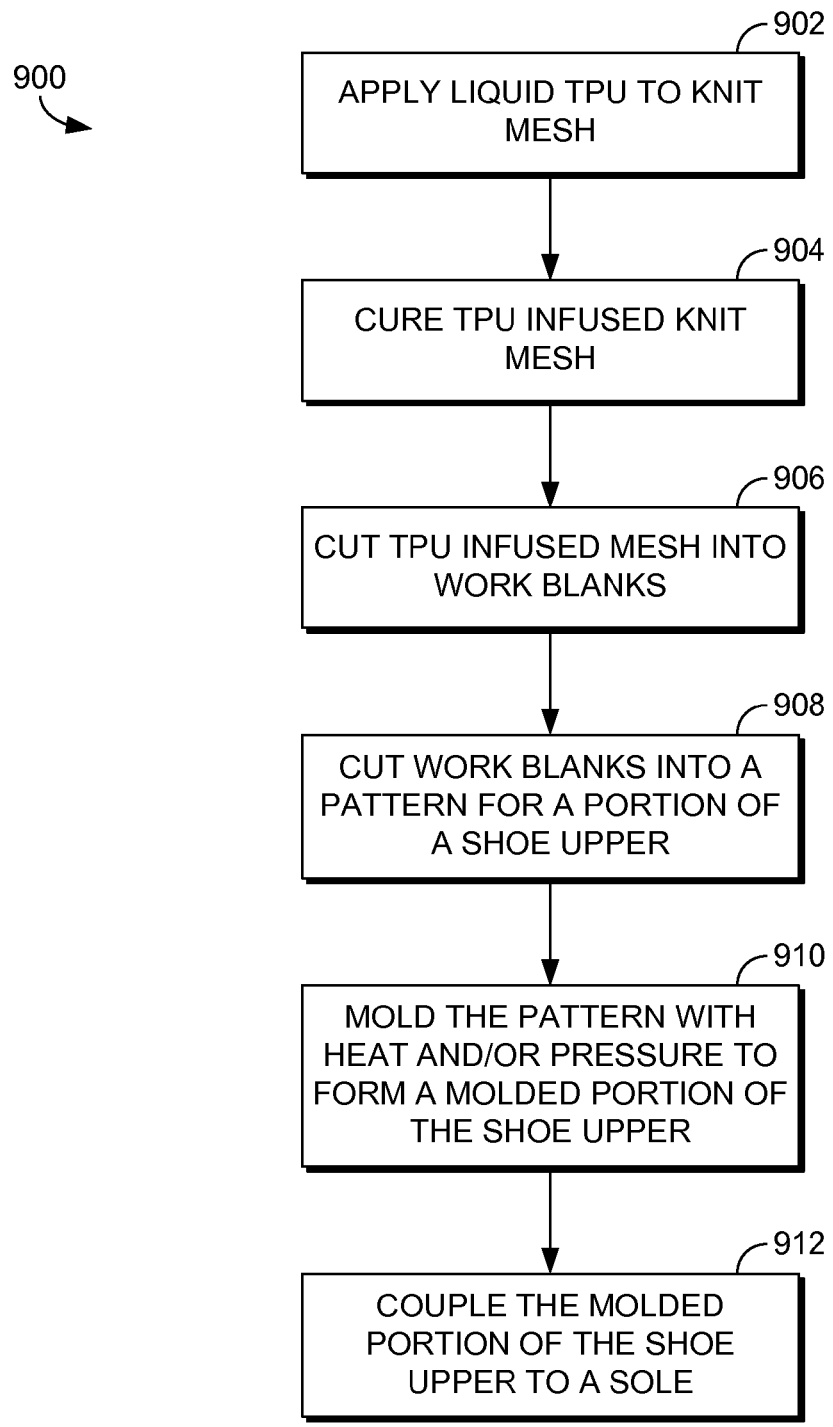
FIG. 9 depicts a diagram illustrating an exemplary method of manufacturing a shoe utilizing a TPU infused mesh, in accordance with embodiments of the present invention.

FIG. 9 depicts an exemplary method 900 for forming a shoe having a TPU mesh upper portion, in accordance with embodiments of the present invention. Formation of the TPU mesh may include, in an exemplary embodiment, applying a liquid TPU to a spacer mesh, as depicted in a block 902. In an exemplary embodiment, the TPU is in a liquid form to evenly and completely coat the various surfaces and structures of the spacer mesh. Therefore, if the TPU is in a solid pellet form, techniques known in the art may be implemented for transforming the solid TPU to a liquid TPU. For example, to achieve a liquid TPU from a pellet-based TPU, the TPU pellet may be raised to a melting temperature of the TPU. Raising the temperature of the solid TPU to its melting temperature will result in the TPU transforming to a liquid state for application to the spacer mesh. However, in an exemplary embodiment, the temperature of the TPU is maintained at a temperature that is less than a melting temperature of the spacer mesh that is intended to be infused with the liquid TPU. If the TPU temperature, as applied to the spacer mesh, exceeds the meting temperature of the spacer mesh, the spacer mesh may melt or otherwise deform in an undesirable manner.

Additional methods may be utilized to transform a solid TPU into a liquid TPU that is suitable for applying to a spacer mesh. A water dispersible TPU (water-dispersed TPU) may be utilized. In this example, the solid TPU may interact with water to form a liquid solution of TPU. In yet another exemplary embodiment, a solvent may be introduced to a solid TPU (solvent-dispersed TPU) to form a liquid TPU that is suitable for applying to a spacer mesh. Other techniques known in the art for achieving a liquid TPU are contemplated and within the scope of the present invention.

Various techniques are contemplated for applying the liquid TPU to the spacer mesh. For example, the spacer mesh may pass through a flow of liquid TPU. The spacer mesh may be submerged or pass through a TPU pool (bath). The liquid TPU may be sprayed and/or rolled onto the spacer mesh.

In an alternative exemplary embodiment, a TPU film, which is a thin sheet of TPU in a flexible film state, is applied to at least one side of a spacer mesh. The TPU film may be manipulated (e.g., heat, solvents, water) to result in the TPU film being applied to the underlying spacer mesh.

Once the TPU is applied to the spacer mesh to form the TPU infused mesh, the TPU mesh is cured, as depicted at a block 904. Curing of the TPU may be performed at room temperatures in an exemplary embodiment. In an additional aspect, it is contemplated that the TPU infused mesh is passed through an oven-like mechanism to apply heat to the TPU infused spacer mesh. It is also contemplated that a directed airflow may be applied to the TPU infused spacer mesh to effectuate a curing process of the TPU infused spacer mesh.

At a block 906, the TPU infused spacer mesh may be cut down into work blanks. For example, the TPU infused spacer mesh may be produced as a large roll of material to achieve advantages of scale when applying and/or curing the TPU infused spacer mesh. However, in an exemplary embodiment, it may be desired to reduce a bulk quantity down to manageable sizes, which are called work blanks. For example, the cured TPU infused spacer mesh may be cut down to a square meter in size. It is understood that other sizes are contemplated. The size of a work blank may be determined by a resulting pattern size to be cut. Additionally, it is contemplated that cutting the cured TPU infused spacer mesh down to work blanks may be an optional task in an exemplary embodiment of the present invention.

At a block 908, the cured TPU infused spacer mesh may be cut into a pattern. The pattern may be specific to a sole onto which the pattern is intended to be coupled. Additionally, the pattern may include one or more portions to be formed from the TPU spacer mesh. For example, a pattern may cut two or more heel portions 214 from a common work blank to reduce waste and manufacturing costs.

The pattern, in an exemplary embodiment, is molded to form a portion of an upper (e.g., the heel portion 214), as depicted at a block 910. For example, the pattern may be molded into a three-dimensional shape that is contoured to form a portion of a shoe's upper. The molding process may utilize heat and/or pressure to form the TPU infused spacer mesh into a desired form. In an exemplary embodiment, the molding process not only forms a portion but is also used to adjust a thickness of one or more location of the desired form. For example, the TPU infused spacer mesh may have a thickness of 4.5 millimeters to 5 millimeter prior to being molded, but a desired uniform thickness of 3 millimeters may be achieved by the molding process compressing the TPU infused spacer mesh. It is further contemplated that areas of a TPU spacer mesh portion may have varied thicknesses formed by the molding process depending on mechanical (or aesthetic) properties that are desired for that particular location.

At a block 912, the molded TPU mesh is coupled to a shoe sole. For example, the heel portion 214 may be coupled (as previously discussed) proximate the perimeter 310 of the sole 300 to form a portion of the upper 200 of the shoe 100. Consequently, a portion of the upper 200 is constructed of the TPU spacer mesh that is visible as part of the upper exterior surface 102.

Additional features of the shoe 100 may include a padding segment 226 (as best seen in FIGS. 1 and 2). In an exemplary embodiment, a cavity may be formed in the TPU mesh as it is molded. The cavity is adapted to receive one or more padding segments. For example, proximate a wearer's ankle, additional padding may be introduced to provide a protective barrier against contact. It is contemplated that a foam segment may be molded into/with the TPU spacer mesh during a primary molding operation to form the TPU mesh into a portion of the upper.

A bootie 700 is also contemplated with embodiments of the shoe 100. The bootie 700 may form an interior liner to receive at least a portion of a wearer's foot in an interior cavity of the shoe 100. In an exemplary embodiment, the bootie 700 is formed from an elastic-type material. The bootie 700 may be secured to the upper 200 proximate the ankle opening, proximate the medial side edge 228, proximate the lateral side edge 230, proximate an Achilles area, and/or proximate the sole 300 (e.g., a top surface of the midsole 314).

While embodiments discussed hereinabove are directed to utilizing the TPU spacer as a portion of an upper, it is contemplated that the TPU spacer mesh may also form any other portions of the shoe 100. For example, the TPU spacer mesh may form a portion of the outsole 312 and/or the midsole 314. Further, it is contemplated that the toe box 500 may be a portion of the upper 200; therefore, it is also contemplated that the toe box 500 may be formed from TPU spacer mesh.

Terms such as bonded, coupled, affixed, adhered, and the like ("coupled") are used herein to describe the temporary, semi-permanent, and/or permanent joining of two components, elements, features, etc. It is contemplated that a first portion may be coupled to a second portion using a number of techniques. For example, glues, adhesives, chemical welding, ultrasonic welding, stitching, tacking, mechanical fasteners, and the like, may be implemented in any combination.

Although the TPU mesh is described above by referring to particular embodiments, it should be understood that the modifications and variations could be made to the shoe construction described without departing from the intended scope of protection provided by the following claims. Additionally, while specific embodiments discussed herein are directed to an article of footwear, Applicants contemplate utilizing a TPU infused mesh for a variety of other purposes. For example, an exemplary embodiment may utilize TPU infused mesh in the automotive industry (e.g., seat portions), fashion industry (e.g., bags), aviation industry (e.g., structural portions), sporting equipment industry (e.g., gloves, hats, balls, padding), and similar industries and applications desiring a semi-rigid, breathable, lightweight, durable, and/or resilient material.

The invention claimed is:

1. A method of manufacturing a thermoplastic polyurethane (TPU) infused material for use in construction of a shoe, the method comprising:
    infusing TPU through an external surface, an interior surface, and a variable lattice structure extending between the exterior surface and the interior surface of a flexible spacer mesh forming a TPU infused material that is effective to form a breathable portion of a shoe;
    curing the TPU infused material;
    cutting the TPU infused material into a pattern useable in construction of the shoe; and
    heat molding the pattern of TPU infused material to form a three-dimensionally shaped molded portion.

2. The method of claim 1, wherein the TPU is applied through a submersion of the material in a liquid TPU.

3. The method of claim 1, wherein the TPU is applied by spraying the material with a liquid TPU.

4. The method of claim 1, wherein the TPU is in a liquid form that is applied to the material by a rolling process.

5. The method of claim 1, wherein the TPU is in a liquid form when applied to the material.

6. The method of claim 1, wherein the TPU is in a flexible film state when applied to the material.

7. The method of claim 1, wherein the TPU is at a temperature below a melting temperature of the spacer mesh material.

8. The method of claim 1, wherein the TPU is a water-dispersed TPU.

9. The method of claim 1, wherein the TPU is a solvent-dispersed TPU.

10. The method of claim 1, wherein the TPU infused material is a substantially flat sheet.

11. The method of claim 1, wherein the TPU is cured at room temperature.

12. The method of claim 1, wherein the TPU is cured utilizing an oven.

13. The method of claim 1, wherein the molded portion forms at least a portion of an upper of the shoe.

14. A method of manufacturing a thermoplastic polyurethane (TPU) infused spacer mesh having an exterior surface, an opposite interior surface, and a variable lattice structure extending between the exterior surface and the interior surface, the infused spacer mesh for use in construction of a shoe, the method comprising:
    infusing the spacer mesh exterior surface, interior surface, and variable lattice structure with TPU forming an infused spacer mesh that is effective to form a breathable portion of a shoe;
    curing the TPU infused spacer mesh material;
    cutting the TPU infused spacer mesh material into a pattern useable in construction of the shoe; and
    heat molding the pattern of TPU infused spacer mesh material to form a three-dimensionally shaped molded portion.

* * * * *